(12) United States Patent
Kucera (10) Patent No.: US 9,835,265 B2
(45) Date of Patent: Dec. 5, 2017

(54) VALVE WITH ACTUATOR DIAGNOSTICS

(71) Applicant: Honeywell International Inc., Morristown, NJ (US)

(72) Inventor: David Kucera, Bilovice nad Svitavou (CZ)

(73) Assignee: Honeywell International Inc., Morris Plains, NJ (US)

(*) Notice: Subject to any disclaimer, the term of this patent is extended or adjusted under 35 U.S.C. 154(b) by 75 days.

(21) Appl. No.: 14/521,337

(22) Filed: Oct. 22, 2014

(65) Prior Publication Data
US 2015/0107675 A1    Apr. 23, 2015

Related U.S. Application Data

(63) Continuation-in-part of application No. 14/107,842, filed on Dec. 16, 2013, which is a (Continued)

(51) Int. Cl.
*F16K 37/00* (2006.01)
*F16K 31/06* (2006.01)
(Continued)

(52) U.S. Cl.
CPC ........ *F16K 37/0041* (2013.01); *F15B 19/005* (2013.01); *F16K 31/06* (2013.01);
(Continued)

(58) Field of Classification Search
CPC . F16K 37/0041; F16K 37/0083; F15B 19/005
(Continued)

(56) References Cited

U.S. PATENT DOCUMENTS

| 156,769 A | 11/1874 | Cameron |
| 424,581 A | 4/1890 | Sickels |

(Continued)

FOREIGN PATENT DOCUMENTS

| DE | 3638604 | 5/1988 |
| DE | 3818363 A1 | 4/1989 |

(Continued)

OTHER PUBLICATIONS

"Flexible, Compact and with a High Performance—the New Valvario, G. Kromschroder AG Launches it's New, Improved Series of Gas Fittings," Press Release, 2 pages, 2003.

(Continued)

*Primary Examiner* — Reinaldo Sanchez-Medina
(74) *Attorney, Agent, or Firm* — Seager, Tufte & Wickhem, LLP (57) ABSTRACT

A system for detection of degradation of a valve mechanism by measuring, for example, the time between powering an actuator and opening of the valve or the time between un-powering the actuator and closing of the valve. Time measurements may be compared with a predetermined threshold or previous measurements. An indication of a gradual degradation of the valve may be detected by an evaluation of a trend of measurements. Thus, a user may be notified of an impending failure before an actual failure of the valve. Diagnostic analysis may be of one or more items selected from a group consisting of combinations of time delays and distances of valve movement upon application and removal of power to the actuator, and one or more performance issues may be correlated for each of many combinations.

14 Claims, 6 Drawing Sheets

Related U.S. Application Data continuation-in-part of application No. 13/326,366, filed on Dec. 15, 2011, now Pat. No. 8,899,264.

(51) Int. Cl.
  *F15B 19/00* (2006.01)
  *F15B 13/044* (2006.01)
  *F15B 13/04* (2006.01)

(52) U.S. Cl.
  CPC ........ *F16K 37/0033* (2013.01); *F15B 13/044* (2013.01); *F15B 2013/0409* (2013.01); *F15B 2211/6336* (2013.01); *F23N 2035/14* (2013.01); *F23N 2035/24* (2013.01); *Y10T 137/0318* (2015.04); *Y10T 137/8242* (2015.04)

(58) Field of Classification Search
  USPC ............. 137/554; 251/129.04; 700/282, 287, 700/297, 302
  See application file for complete search history.

(56) References Cited

U.S. PATENT DOCUMENTS

| | | | |
|---|---|---|---|
| 1,033,204 | A | 7/1912 | Skinner |
| 1,147,840 | A | 7/1915 | Bowser |
| 1,156,977 | A | 10/1915 | Cloos |
| 1,165,315 | A | 12/1915 | Cameron |
| 1,206,532 | A | 11/1916 | Gray |
| 1,847,385 | A | 3/1932 | Dengler |
| 2,093,122 | A | 9/1937 | Andrews |
| 2,196,798 | A | 4/1940 | Horstmann |
| 2,403,692 | A | 7/1946 | Tibbetts |
| 2,791,238 | A | 5/1957 | Bryant |
| 2,975,307 | A | 3/1961 | Schroeder et al. |
| 3,164,364 | A | 1/1965 | McColl |
| 3,202,170 | A | 8/1965 | Holbrook |
| 3,304,406 | A | 2/1967 | King |
| 3,346,008 | A | 10/1967 | Scaramucci |
| 3,381,623 | A | 5/1968 | Elliott |
| 3,393,965 | A | 7/1968 | Vaughan |
| 3,414,010 | A | 12/1968 | Sparrow |
| 3,493,005 | A | 2/1970 | Kakegawa |
| 3,641,373 | A | 2/1972 | Elkuch |
| 3,646,969 | A | 3/1972 | Stampfli |
| 3,744,754 | A | 7/1973 | Demi |
| 3,768,955 | A | 10/1973 | McLaughlin |
| 3,769,531 | A | 10/1973 | Elkuch |
| 3,803,424 | A | 4/1974 | Smiley et al. |
| 3,884,266 | A | 5/1975 | Kondo |
| 3,947,644 | A | 3/1976 | Uchikawa |
| 3,960,364 | A | 6/1976 | Hargrave |
| 3,973,576 | A | 8/1976 | Dietiker |
| 3,973,976 | A | 8/1976 | Boyd |
| 3,993,939 | A | 11/1976 | Slavin et al. |
| 4,114,652 | A | 9/1978 | Oberle |
| 4,115,036 | A | 9/1978 | Paterson |
| 4,140,936 | A | 2/1979 | Bullock |
| 4,188,013 | A | 2/1980 | Battersby et al. |
| 4,188,972 | A | 2/1980 | Van Der Zee |
| 4,197,737 | A | 4/1980 | Pittman |
| 4,242,080 | A | 12/1980 | Tabei |
| 4,277,832 | A | 7/1981 | Wong |
| 4,360,955 | A | 11/1982 | Block |
| 4,402,340 | A | 9/1983 | Lockwood, Jr. |
| 4,406,131 | A | 9/1983 | Weasel, Jr. |
| 4,418,886 | A | 12/1983 | Holzer |
| 4,442,853 | A | 4/1984 | Gort |
| 4,450,868 | A | 5/1984 | Duval et al. |
| 4,453,169 | A | 6/1984 | Martner |
| 4,478,076 | A | 10/1984 | Bohrer |
| 4,478,077 | A | 10/1984 | Bohrer et al. |
| 4,481,776 | A | 11/1984 | Araki et al. |
| 4,493,303 | A | 1/1985 | Thompson et al. |
| 4,498,850 | A | 2/1985 | Perlov et al. |
| 4,501,144 | A | 2/1985 | Higashi et al. |
| 4,539,575 | A | 9/1985 | Nilsson |
| 4,543,974 | A | 10/1985 | Dietiker et al. |
| 4,576,050 | A | 3/1986 | Lambert |
| 4,581,624 | A | 4/1986 | O'Connor |
| 4,581,707 | A | 4/1986 | Millar |
| 4,585,209 | A | 4/1986 | Aine et al. |
| 4,619,438 | A | 10/1986 | Coffee |
| 4,622,699 | A | 11/1986 | Spriggs |
| 4,628,499 | A * | 12/1986 | Hammett .............. F15B 11/048 318/599 |
| 4,645,450 | A | 2/1987 | West |
| 4,651,564 | A | 3/1987 | Johnson et al. |
| 4,654,546 | A | 3/1987 | Kirjavainen |
| 4,698,015 | A | 10/1987 | Brunel |
| 4,722,360 | A | 2/1988 | Odajima et al. |
| 4,756,508 | A | 7/1988 | Giachino et al. |
| 4,815,699 | A | 3/1989 | Mueller |
| 4,821,999 | A | 4/1989 | Ohtaka |
| 4,829,826 | A | 5/1989 | Valentin et al. |
| 4,835,717 | A | 5/1989 | Michel et al. |
| 4,836,247 | A | 6/1989 | Chuang |
| 4,898,200 | A | 2/1990 | Odajima et al. |
| 4,911,616 | A | 3/1990 | Laumann, Jr. |
| 4,915,613 | A | 4/1990 | Landis |
| 4,938,742 | A | 7/1990 | Smits |
| 4,939,405 | A | 7/1990 | Okuyama et al. |
| 5,022,435 | A | 6/1991 | Jaw-Shiunn |
| 5,057,822 | A | 10/1991 | Hoffman |
| 5,065,978 | A | 11/1991 | Albarda et al. |
| 5,069,419 | A | 12/1991 | Jerman |
| 5,070,252 | A | 12/1991 | Castenschiold et al. |
| 5,078,581 | A | 1/1992 | Blum et al. |
| 5,082,242 | A | 1/1992 | Bonne et al. |
| 5,082,246 | A | 1/1992 | Stanley et al. |
| 5,085,562 | A | 2/1992 | Van Lintel |
| 5,096,388 | A | 3/1992 | Weinberg |
| 5,129,794 | A | 7/1992 | Beatty |
| 5,146,941 | A | 9/1992 | Statler |
| 5,148,074 | A | 9/1992 | Fujita et al. |
| 5,171,132 | A | 12/1992 | Miyazaki et al. |
| 5,176,358 | A | 1/1993 | Bonne et al. |
| 5,180,288 | A | 1/1993 | Richter et al. |
| 5,180,623 | A | 1/1993 | Ohnstein |
| 5,186,054 | A | 2/1993 | Sekimura |
| 5,190,068 | A | 3/1993 | Philbin |
| 5,192,197 | A | 3/1993 | Culp |
| 5,193,993 | A | 3/1993 | Dietiker |
| 5,199,456 | A | 4/1993 | Love et al. |
| 5,199,462 | A | 4/1993 | Baker |
| 5,203,688 | A | 4/1993 | Dietiker |
| 5,205,323 | A | 4/1993 | Baker |
| 5,206,557 | A | 4/1993 | Bobbio |
| 5,215,112 | A | 6/1993 | Davison |
| 5,215,115 | A | 6/1993 | Dietiker |
| 5,219,278 | A | 6/1993 | Van Lintel |
| 5,224,843 | A | 7/1993 | Van Lintel |
| 5,244,527 | A | 9/1993 | Aoyagi |
| 5,244,537 | A | 9/1993 | Ohnstein |
| 5,263,514 | A | 11/1993 | Reeves |
| 5,294,089 | A | 3/1994 | LaMarca |
| 5,322,258 | A | 6/1994 | Bosch et al. |
| 5,323,999 | A | 6/1994 | Bonne |
| 5,325,880 | A | 7/1994 | Johnson et al. |
| 5,336,062 | A | 8/1994 | Richter |
| 5,368,571 | A | 11/1994 | Horres, Jr. |
| 5,388,607 | A | 2/1995 | Ramaker et al. |
| 5,441,597 | A | 8/1995 | Bonne et al. |
| 5,449,142 | A | 9/1995 | Banick |
| 5,452,878 | A | 9/1995 | Gravesen et al. |
| 5,460,196 | A | 10/1995 | Yonnet |
| 5,477,877 | A | 12/1995 | Schulze et al. |
| 5,499,909 | A | 3/1996 | Yamada et al. |
| 5,513,611 | A | 5/1996 | Ricouard et al. |
| 5,520,533 | A | 5/1996 | Vrolijk |
| 5,526,172 | A | 6/1996 | Kanack |
| 5,529,465 | A | 6/1996 | Zengerle et al. |
| 5,536,963 | A | 7/1996 | Polla |
| 5,538,220 | A | 7/1996 | LaMarca |

(56) References Cited

U.S. PATENT DOCUMENTS

| | | |
|---|---|---|
| 5,541,465 A | 7/1996 | Higuchi et al. |
| 5,552,654 A | 9/1996 | Konno et al. |
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,642,015 A | 6/1997 | Whitehead et al. |
| 5,676,342 A | 10/1997 | Otto et al. |
| 5,683,159 A | 11/1997 | Johnson |
| 5,685,707 A | 11/1997 | Ramsdell et al. |
| 5,696,662 A | 12/1997 | Bauhahn |
| 5,725,363 A | 3/1998 | Bustgens et al. |
| 5,735,503 A | 4/1998 | Hietkamp |
| 5,741,978 A | 4/1998 | Gudmundsson |
| 5,748,432 A | 5/1998 | Przywozny et al. |
| 5,755,259 A | 5/1998 | Schulze et al. |
| 5,759,014 A | 6/1998 | Van Lintel |
| 5,759,015 A | 6/1998 | Van Lintel et al. |
| 5,769,043 A | 6/1998 | Nitkiewicz |
| 5,774,372 A | 6/1998 | Berwanger |
| 5,790,420 A | 8/1998 | Lang |
| 5,792,957 A | 8/1998 | Luder et al. |
| 5,797,358 A | 8/1998 | Brandt et al. |
| 5,808,205 A | 9/1998 | Romo |
| 5,822,170 A | 10/1998 | Cabuz et al. |
| 5,827,950 A | 10/1998 | Woodbury et al. |
| 5,836,750 A | 11/1998 | Cabuz |
| 5,839,467 A | 11/1998 | Saaski et al. |
| 5,847,523 A | 12/1998 | Rappenecker et al. |
| 5,863,708 A | 1/1999 | Zanzucchi et al. |
| 5,887,847 A | 3/1999 | Holborow |
| 5,893,389 A | 4/1999 | Cunningham |
| 5,901,939 A | 5/1999 | Cabuz et al. |
| 5,911,872 A | 6/1999 | Lewis et al. |
| 5,918,852 A | 7/1999 | Otto |
| 5,933,573 A | 8/1999 | Lukenich et al. |
| 5,944,257 A | 8/1999 | Dietiker et al. |
| 5,954,079 A | 9/1999 | Barth et al. |
| 5,954,089 A | 9/1999 | Seymour |
| 5,957,158 A | 9/1999 | Volz et al. |
| 5,959,448 A | 9/1999 | Baranski et al. |
| 5,967,124 A | 10/1999 | Cook et al. |
| 5,971,355 A | 10/1999 | Biegelsen et al. |
| 5,982,274 A | 11/1999 | Stelter et al. |
| 5,986,573 A | 11/1999 | Franklin et al. |
| 6,003,552 A | 12/1999 | Shank et al. |
| 6,021,652 A | 2/2000 | Walker |
| 6,050,281 A | 4/2000 | Adams et al. |
| 6,057,771 A | 5/2000 | Lakra |
| 6,077,068 A | 6/2000 | Okumura |
| 6,106,245 A | 8/2000 | Cabuz |
| 6,109,889 A | 8/2000 | Zengerle et al. |
| 6,116,863 A | 9/2000 | Ahn et al. |
| 6,122,973 A | 9/2000 | Nomura et al. |
| 6,151,967 A | 11/2000 | McIntosh et al. |
| 6,152,168 A | 11/2000 | Ohmi et al. |
| 6,155,531 A | 12/2000 | Holborow et al. |
| 6,167,761 B1 | 1/2001 | Hanzawa et al. |
| 6,176,247 B1 | 1/2001 | Winchcomb et al. |
| 6,179,000 B1 | 1/2001 | Zdobinski et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,189,568 B1 | 2/2001 | Bergum et al. |
| 6,215,221 B1 | 4/2001 | Cabuz et al. |
| 6,240,944 B1 | 6/2001 | Ohnstein et al. |
| 6,242,909 B1 | 6/2001 | Dorsey et al. |
| 6,247,919 B1 | 6/2001 | Welz, Jr. et al. |
| 6,255,609 B1 | 7/2001 | Samuelson et al. |
| 6,263,908 B1 | 7/2001 | Love et al. |
| 6,288,472 B1 | 9/2001 | Cabuz et al. |
| 6,297,640 B1 | 10/2001 | Hayes |
| 6,321,781 B1 | 11/2001 | Kurth |
| 6,360,773 B1 | 3/2002 | Rhodes |
| 6,373,682 B1 | 4/2002 | Goodwin-Johansson |
| 6,386,234 B2 | 5/2002 | Sontag |
| 6,390,027 B1 | 5/2002 | Lyons et al. |
| 6,397,798 B1 | 6/2002 | Fiaccabrino |
| 6,401,753 B2 | 6/2002 | Neu |
| 6,418,793 B1 | 7/2002 | Pechoux et al. |
| 6,445,053 B1 | 9/2002 | Cho |
| 6,450,200 B1 | 9/2002 | Ollivier |
| 6,460,567 B1 | 10/2002 | Hansen, III et al. |
| 6,463,546 B1 | 10/2002 | Jeske et al. |
| 6,496,348 B2 | 12/2002 | McIntosh |
| 6,496,786 B1 | 12/2002 | Dieterle et al. |
| 6,505,838 B1 | 1/2003 | Cavaliere |
| 6,508,528 B2 | 1/2003 | Fujii et al. |
| 6,520,753 B1 | 2/2003 | Grosjean et al. |
| 6,533,574 B1 | 3/2003 | Pechoux |
| 6,536,287 B2 | 3/2003 | Beekhuizen et al. |
| 6,537,060 B2 | 3/2003 | Vegter |
| 6,547,554 B2 | 4/2003 | Koegl et al. |
| 6,550,495 B1 | 4/2003 | Schulze |
| 6,553,979 B2 | 4/2003 | Albright |
| 6,561,791 B1 | 5/2003 | Vrolijk et al. |
| 6,563,233 B1 | 5/2003 | Hinks |
| 6,564,824 B2 | 5/2003 | Lowery et al. |
| 6,571,817 B1 | 6/2003 | Bohan, Jr. |
| 6,572,077 B1 | 6/2003 | Worner |
| 6,579,087 B1 | 6/2003 | Vrolijk |
| 6,584,852 B2 | 7/2003 | Suzuki et al. |
| 6,590,267 B1 | 7/2003 | Goodwin-Johansson et al. |
| 6,606,911 B2 | 8/2003 | Akiyama et al. |
| 6,619,388 B2 | 9/2003 | Dietz et al. |
| 6,619,612 B2 | 9/2003 | Freisinger et al. |
| 6,623,012 B1 | 9/2003 | Perry et al. |
| 6,640,642 B1 | 11/2003 | Onose et al. |
| 6,644,351 B2 | 11/2003 | LaMarca et al. |
| 6,650,211 B2 | 11/2003 | Pimouguet |
| 6,651,506 B2 | 11/2003 | Lee et al. |
| 6,651,636 B1 | 11/2003 | Albright |
| 6,651,954 B1 | 11/2003 | Porcher et al. |
| 6,655,409 B1 | 12/2003 | Steenburgh et al. |
| 6,655,652 B2 | 12/2003 | Meinhof |
| 6,658,928 B1 | 12/2003 | Pollack et al. |
| 6,676,580 B2 | 1/2004 | Tsai et al. |
| 6,704,186 B2 | 3/2004 | Ishikura |
| 6,725,167 B2 | 4/2004 | Grumstrup et al. |
| 6,728,600 B1 | 4/2004 | Contaldo et al. |
| 6,729,601 B2 | 5/2004 | Freisinger et al. |
| 6,742,541 B2 | 6/2004 | Pimouguet |
| 6,768,406 B1 | 7/2004 | Fiaccabrino |
| 6,796,326 B2 | 9/2004 | Bayer |
| 6,813,954 B2 | 11/2004 | Gokhfeld |
| 6,814,102 B2 | 11/2004 | Hess et al. |
| 6,814,339 B2 | 11/2004 | Berger et al. |
| 6,819,208 B1 | 11/2004 | Peghaire et al. |
| 6,820,650 B2 | 11/2004 | Solet et al. |
| 6,825,632 B2 | 11/2004 | Hahn et al. |
| 6,826,947 B2 | 12/2004 | Solet et al. |
| 6,851,298 B2 | 2/2005 | Miura et al. |
| 6,874,367 B2 | 4/2005 | Jakobsen |
| 6,877,380 B2 | 4/2005 | Lewis |
| 6,877,383 B2 | 4/2005 | Horie et al. |
| 6,880,548 B2 | 4/2005 | Schultz et al. |
| 6,880,567 B2 | 4/2005 | Klaver et al. |
| 6,885,184 B1 | 4/2005 | Gofman |
| 6,888,354 B1 | 5/2005 | Gofman |
| 6,889,705 B2 | 5/2005 | Newman et al. |
| 6,892,756 B2 | 5/2005 | Schulze |
| 6,906,484 B1 | 6/2005 | Berroth et al. |
| 6,918,756 B2 | 7/2005 | Fredricks et al. |
| 6,923,069 B1 | 8/2005 | Stewart |
| 6,956,340 B2 | 10/2005 | Schondelmaier et al. |
| 6,956,343 B2 | 10/2005 | Berroth et al. |
| 6,968,851 B2 | 11/2005 | Ramirez et al. |
| 6,981,426 B2 | 1/2006 | Wang et al. |
| 6,983,759 B2 | 1/2006 | Maichel et al. |
| 6,984,122 B2 | 1/2006 | Sullivan et al. |
| 6,994,308 B2 | 2/2006 | Wang et al. |
| 6,997,684 B2 | 2/2006 | Hahn et al. |
| 7,000,635 B2 | 2/2006 | Erbe et al. |

(56) References Cited

U.S. PATENT DOCUMENTS

| | | |
|---|---|---|
| 7,004,034 B2 | 2/2006 | Chen |
| 7,039,502 B2 | 5/2006 | Berwanger et al. |
| 7,048,536 B2 | 5/2006 | Sullivan et al. |
| 7,066,203 B2 | 6/2006 | Baarda |
| 7,082,835 B2 | 8/2006 | Cook et al. |
| 7,089,086 B2 | 8/2006 | Schoonover |
| 7,089,959 B2 | 8/2006 | Cai |
| 7,093,611 B2 | 8/2006 | Murray et al. |
| 7,101,172 B2 | 9/2006 | Jaeschke |
| 7,107,820 B2 | 9/2006 | Nunnally et al. |
| 7,119,504 B2 | 10/2006 | Dornhof |
| 7,121,525 B2 | 10/2006 | Gelez |
| 7,174,771 B2 | 2/2007 | Cooper |
| 7,216,547 B1 | 5/2007 | Stewart et al. |
| 7,223,094 B2 | 5/2007 | Goebel |
| 7,225,056 B2 | 5/2007 | Bolduan et al. |
| 7,249,610 B2 | 7/2007 | Moses |
| 7,290,502 B2 | 11/2007 | Kidd et al. |
| 7,302,863 B2 | 12/2007 | Kielb et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,402,038 B2 | 7/2008 | Neville et al. |
| 7,402,925 B2 | 7/2008 | Best et al. |
| 7,405,609 B2 | 7/2008 | Krotsch |
| 7,422,028 B2 | 9/2008 | Nugent et al. |
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |
| 7,503,221 B2 | 3/2009 | Wade |
| 7,504,961 B2 | 3/2009 | Flanders |
| 7,520,487 B2 | 4/2009 | Mattes |
| 7,537,019 B2 | 5/2009 | Ting et al. |
| 7,543,604 B2 | 6/2009 | Benda |
| 7,553,151 B2 | 6/2009 | O'Mara et al. |
| 7,556,238 B2 | 7/2009 | Seberger |
| 7,574,896 B1 | 8/2009 | Cooper |
| 7,586,228 B2 | 9/2009 | Best |
| 7,586,276 B2 | 9/2009 | Dornhoff |
| 7,624,755 B2 | 12/2009 | Benda et al. |
| 7,627,455 B2 | 12/2009 | Lenz et al. |
| 7,644,731 B2 | 1/2010 | Benda et al. |
| 7,647,940 B2 | 1/2010 | Minervini et al. |
| 7,669,461 B2 | 3/2010 | Kates |
| 7,688,011 B2 | 3/2010 | Berroth et al. |
| 7,715,168 B2 | 5/2010 | Gofman et al. |
| 7,735,509 B2 | 6/2010 | Galloway et al. |
| 7,740,024 B2 | 6/2010 | Brodeur et al. |
| 7,759,884 B2 | 7/2010 | Dufner et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,216 B2 | 2/2011 | Boger et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,905,251 B2 | 3/2011 | Flanders |
| 7,922,481 B2 | 4/2011 | Geiger et al. |
| 7,940,189 B2 | 5/2011 | Brown |
| 8,020,585 B2 | 9/2011 | Shock et al. |
| 8,036,837 B2 | 10/2011 | Wilke |
| 8,066,255 B2 | 11/2011 | Wang |
| 8,109,289 B2 | 2/2012 | Trnka et al. |
| 8,126,631 B2 | 2/2012 | Scalia, Jr. |
| 8,201,572 B2 | 6/2012 | Segal |
| 8,205,484 B2 | 6/2012 | Sasaki |
| 8,225,814 B2 | 7/2012 | Igarashi |
| 8,240,636 B2 | 8/2012 | Smith |
| 8,265,794 B2 | 9/2012 | Minervini et al. |
| 8,271,141 B2 | 9/2012 | Cummings et al. |
| 8,303,297 B2 | 11/2012 | Tompkins |
| 8,307,845 B2 | 11/2012 | Kouchi et al. |
| 8,381,760 B2 | 2/2013 | Santinanavat et al. |
| 8,387,441 B2 | 3/2013 | Falta et al. |
| 8,424,563 B2 | 4/2013 | Haller et al. |
| 8,639,464 B2 | 1/2014 | Artiuch et al. |
| 8,677,913 B2 | 3/2014 | Kastingschafer et al. |
| 8,961,169 B2 | 2/2015 | Newby et al. |
| 2002/0029808 A1 | 3/2002 | Friend et al. |
| 2002/0157713 A1 | 10/2002 | Pimouguet |
| 2002/0175791 A1 | 11/2002 | LaMarca et al. |
| 2003/0011136 A1 | 1/2003 | Ramirez et al. |
| 2003/0117098 A1 | 6/2003 | Berroth et al. |
| 2003/0150499 A1 | 8/2003 | Solet et al. |
| 2003/0167851 A1 | 9/2003 | Parker |
| 2003/0201414 A1 | 10/2003 | Freisinger et al. |
| 2004/0035211 A1 | 2/2004 | Pinto et al. |
| 2004/0129909 A1 | 7/2004 | Wiese |
| 2004/0263103 A1 | 12/2004 | Weisser et al. |
| 2005/0058961 A1 | 3/2005 | Moses |
| 2005/0166979 A1 | 8/2005 | Berger et al. |
| 2005/0199286 A1 | 9/2005 | Appleford et al. |
| 2005/0255418 A1 | 11/2005 | Goebel |
| 2005/0279956 A1 | 12/2005 | Berger et al. |
| 2006/0202572 A1 | 9/2006 | Tungl et al. |
| 2006/0226299 A1 | 10/2006 | Tungl et al. |
| 2006/0228237 A1 | 10/2006 | Winkler |
| 2006/0243334 A1 | 11/2006 | Brochhaus et al. |
| 2006/0260701 A1 | 11/2006 | Mattes |
| 2006/0272712 A1 | 12/2006 | Sontag |
| 2006/0278281 A1 | 12/2006 | Gynz-Rekowski et al. |
| 2007/0024225 A1 | 2/2007 | Hahn et al. |
| 2007/0068511 A1 | 3/2007 | Bachinsky et al. |
| 2007/0089789 A1 | 4/2007 | Mudd et al. |
| 2007/0095144 A1 | 5/2007 | Oboodi et al. |
| 2007/0164243 A1 | 7/2007 | Volz |
| 2007/0189739 A1 | 8/2007 | Dufner et al. |
| 2007/0241705 A1 | 10/2007 | Karwath |
| 2007/0256478 A1 | 11/2007 | Guadagnoia et al. |
| 2007/0257628 A1 | 11/2007 | Gofman et al. |
| 2008/0035456 A1 | 2/2008 | Melchionne, Jr. |
| 2008/0099082 A1 | 5/2008 | Moenkhaus |
| 2008/0156077 A1 | 7/2008 | Flanders et al. |
| 2008/0157707 A1 | 7/2008 | Jeske et al. |
| 2008/0297084 A1 | 12/2008 | Berroth et al. |
| 2008/0315807 A1 | 12/2008 | Loffler et al. |
| 2008/0318098 A1 | 12/2008 | Matsunaga |
| 2008/0318172 A1 | 12/2008 | Geiger et al. |
| 2009/0068503 A1 | 3/2009 | Yamazaki et al. |
| 2009/0120338 A1 | 5/2009 | Adendorf et al. |
| 2009/0126798 A1 | 5/2009 | Mather |
| 2009/0142717 A1 | 6/2009 | Lavelle |
| 2009/0146091 A1 | 6/2009 | Ams et al. |
| 2009/0148798 A1 | 6/2009 | Geiger et al. |
| 2009/0197212 A1 | 8/2009 | Masen |
| 2009/0240445 A1 | 9/2009 | Umekage et al. |
| 2009/0280989 A1 | 11/2009 | Astra et al. |
| 2009/0288399 A1 | 11/2009 | Fayard |
| 2009/0303076 A1 | 12/2009 | Setiadi et al. |
| 2009/0306830 A1* | 12/2009 | Cummings ........... F15B 19/005 700/282 |
| 2010/0018324 A1 | 1/2010 | Kilian et al. |
| 2010/0043896 A1 | 2/2010 | Shock et al. |
| 2010/0064818 A1 | 3/2010 | Shubert |
| 2010/0074777 A1 | 3/2010 | Laufer et al. |
| 2010/0102259 A1 | 4/2010 | Forster |
| 2010/0112500 A1 | 5/2010 | Maiello et al. |
| 2010/0146939 A1 | 6/2010 | Sim et al. |
| 2010/0180688 A1 | 7/2010 | Khemet et al. |
| 2010/0180882 A1 | 7/2010 | Oberhomburg et al. |
| 2010/0193045 A1 | 8/2010 | Xu |
| 2010/0254826 A1 | 10/2010 | Streng et al. |
| 2010/0269931 A1 | 10/2010 | Seebauer |
| 2010/0282988 A1 | 11/2010 | Kasprzyk et al. |
| 2010/0315027 A1 | 12/2010 | Wystup et al. |

(56) References Cited

U.S. PATENT DOCUMENTS

| | | | |
|---|---|---|---|
| 2011/0025237 A1 | 2/2011 | Wystup et al. |
| 2011/0033808 A1 | 2/2011 | Geiger et al. |
| 2011/0039217 A1 | 2/2011 | Happe |
| 2011/0041483 A1 | 2/2011 | Kapparos |
| 2011/0046903 A1 | 2/2011 | Franklin |
| 2011/0080072 A1 | 4/2011 | Strobel et al. |
| 2011/0137579 A1 | 6/2011 | Seebauer |
| 2011/0240157 A1 | 10/2011 | Jones et al. |
| 2011/0266473 A1 | 11/2011 | Santinanavat et al. |
| 2011/0270544 A1 | 11/2011 | Kucera et al. |
| 2011/0284777 A1 | 11/2011 | Pitchford et al. |
| 2012/0107753 A1 | 5/2012 | Kemp |
| 2013/0152673 A1 | 6/2013 | Young et al. |
| 2013/0153035 A1 | 6/2013 | Young et al. |
| 2013/0153036 A1 | 6/2013 | Young et al. |
| 2013/0153041 A1 | 6/2013 | Kucera |
| 2013/0153042 A1 | 6/2013 | Young et al. |
| 2013/0153062 A1 | 6/2013 | Young et al. |
| 2013/0153798 A1 | 6/2013 | Kucera et al. |
| 2013/0154841 A1 | 6/2013 | Kucera et al. |
| 2014/0080075 A1 | 3/2014 | Young et al. |
| 2014/0096850 A1 | 4/2014 | Filkovski et al. |
| 2015/0045971 A1 | 2/2015 | Endel et al. |

FOREIGN PATENT DOCUMENTS

| | | |
|---|---|---|
| DE | 19617852 | 10/1997 |
| DE | 19824521 | 12/1999 |
| DE | 102005033611 | 10/2006 |
| EP | 0062854 A1 | 10/1982 |
| EP | 0068517 B1 | 1/1986 |
| EP | 0275439 | 7/1988 |
| EP | 0282758 | 9/1988 |
| EP | 0356690 | 5/1993 |
| EP | 0563787 | 10/1993 |
| EP | 0617234 | 9/1994 |
| EP | 0522479 | 5/1996 |
| EP | 0744821 | 11/1996 |
| EP | 0645562 | 12/1996 |
| EP | 0678178 | 12/1996 |
| EP | 0664422 | 4/1997 |
| EP | 0665396 | 1/1998 |
| EP | 0822376 | 2/1998 |
| EP | 0817931 | 12/1998 |
| EP | 0652501 | 3/1999 |
| EP | 0907052 | 4/1999 |
| EP | 0817934 | 5/1999 |
| EP | 0896192 | 10/1999 |
| EP | 0952357 | 10/1999 |
| EP | 0757200 | 4/2000 |
| EP | 1031792 | 8/2000 |
| EP | 1069357 | 1/2001 |
| EP | 0896191 | 2/2001 |
| EP | 1084358 | 3/2001 |
| EP | 0881435 | 9/2001 |
| EP | 1186779 | 3/2002 |
| EP | 0976957 | 4/2002 |
| EP | 1157205 | 9/2002 |
| EP | 1121511 | 4/2003 |
| EP | 0992658 | 5/2003 |
| EP | 1323966 | 7/2003 |
| EP | 1078187 | 8/2003 |
| EP | 1084357 | 8/2003 |
| EP | 1382907 | 1/2004 |
| EP | 1403885 | 3/2004 |
| EP | 1413045 | 4/2004 |
| EP | 1424708 | 6/2004 |
| EP | 1176317 | 8/2004 |
| EP | 1269054 | 8/2004 |
| EP | 1484509 | 12/2004 |
| EP | 1073192 | 1/2005 |
| EP | 1191676 | 1/2005 |
| EP | 1275039 | 1/2005 |
| EP | 1499008 | 1/2005 |
| EP | 1446607 | 3/2005 |
| EP | 1510756 | 3/2005 |
| EP | 1299665 | 4/2005 |
| EP | 1324496 | 6/2005 |
| EP | 1535388 | 6/2005 |
| EP | 1584870 | 10/2005 |
| EP | 1243857 | 12/2005 |
| EP | 1282798 | 12/2005 |
| EP | 0843287 | 2/2006 |
| EP | 1346463 | 3/2006 |
| EP | 1659462 | 5/2006 |
| EP | 1703140 | 9/2006 |
| EP | 1703146 | 9/2006 |
| EP | 1183772 | 10/2006 |
| EP | 1303718 | 10/2006 |
| EP | 1314240 | 10/2006 |
| EP | 1256763 | 11/2006 |
| EP | 1727268 | 11/2006 |
| EP | 1559936 | 12/2006 |
| EP | 1748534 | 1/2007 |
| EP | 1748545 | 1/2007 |
| EP | 1327808 | 2/2007 |
| EP | 1329659 | 2/2007 |
| EP | 1291532 | 6/2007 |
| EP | 1610046 | 6/2007 |
| EP | 1592905 | 7/2007 |
| EP | 1610045 | 7/2007 |
| EP | 1727261 | 10/2007 |
| EP | 1860328 | 11/2007 |
| EP | 1882882 | 1/2008 |
| EP | 1626321 | 2/2008 |
| EP | 1848907 | 4/2008 |
| EP | 1936778 | 6/2008 |
| EP | 1536169 | 11/2008 |
| EP | 1298679 | 12/2008 |
| EP | 1714040 | 12/2008 |
| EP | 2014979 | 1/2009 |
| EP | 1669648 | 2/2009 |
| EP | 2048439 | 4/2009 |
| EP | 2107248 | 7/2009 |
| EP | 2093545 | 8/2009 |
| EP | 1715229 | 10/2009 |
| EP | 2116857 | 11/2009 |
| EP | 2119946 | 11/2009 |
| EP | 1370787 | 3/2010 |
| EP | 1413044 | 3/2010 |
| EP | 2164164 | 3/2010 |
| EP | 2177796 | 4/2010 |
| EP | 2178201 | 4/2010 |
| EP | 1970610 | 5/2010 |
| EP | 2197101 | 6/2010 |
| EP | 2068056 | 8/2010 |
| EP | 2212984 | 8/2010 |
| EP | 1712800 | 10/2010 |
| EP | 2118493 | 10/2010 |
| EP | 2242344 | 10/2010 |
| EP | 1715582 | 11/2010 |
| EP | 1675757 | 12/2010 |
| EP | 2267883 | 12/2010 |
| EP | 1703139 | 1/2011 |
| EP | 2286976 | 2/2011 |
| EP | 1596495 | 4/2011 |
| EP | 2306622 | 4/2011 |
| EP | 2010500 | 6/2011 |
| EP | 2113696 | 7/2011 |
| GB | 2099158 | 12/1982 |
| GB | 2327750 | 2/1999 |
| JP | 02-086258 | 3/1990 |
| JP | 05-219760 | 8/1993 |
| JP | 9061284 | 3/1997 |
| JP | 9184600 | 7/1997 |
| JP | 2004125809 | 4/2004 |
| JP | 2004309159 | 11/2004 |
| JP | 2008135922 | 6/2008 |
| JP | 2008286478 | 11/2008 |
| SU | 744877 | 6/1980 |
| WO | WO 87/05375 | 9/1987 |
| WO | WO 96/27095 | 9/1996 |
| WO | WO 97/29538 | 8/1997 |
| WO | 9801709 A2 | 1/1998 |

(56) References Cited

FOREIGN PATENT DOCUMENTS

| | | |
|---|---|---|
| WO | WO 99/24758 | 5/1999 |
| WO | WO 99/60292 | 11/1999 |
| WO | WO 99/64769 | 12/1999 |
| WO | WO 99/64770 | 12/1999 |
| WO | WO 00/28215 | 5/2000 |
| WO | WO 01/06179 | 1/2001 |
| WO | WO 01/33078 | 5/2001 |
| WO | WO 01/61226 | 8/2001 |
| WO | WO 01/73297 | 10/2001 |
| WO | WO 01/90617 | 11/2001 |
| WO | WO 02/04852 | 1/2002 |
| WO | WO 02/077502 | 10/2002 |
| WO | WO 02/084156 | 10/2002 |
| WO | WO 02/086365 | 10/2002 |
| WO | WO 02/086918 | 10/2002 |
| WO | WO 02/097840 | 12/2002 |
| WO | WO 2004/059830 | 7/2004 |
| WO | WO 2004/070245 | 8/2004 |
| WO | WO 2005/042313 | 3/2005 |
| WO | WO 2005/076455 | 8/2005 |
| WO | WO 2005/076456 | 8/2005 |
| WO | WO 2005/085652 | 9/2005 |
| WO | WO 2005/094150 | 10/2005 |
| WO | WO 2006/000366 | 1/2006 |
| WO | WO 2006/000367 | 1/2006 |
| WO | WO 2006/053816 | 3/2006 |
| WO | WO 2006/039956 | 4/2006 |
| WO | WO 2006/042635 | 4/2006 |
| WO | WO 2006/077069 | 7/2006 |
| WO | WO 2006/088367 | 8/2006 |
| WO | 2007018876 A1 | 2/2007 |
| WO | WO 2007/012419 | 2/2007 |
| WO | WO 2007/093312 | 8/2007 |
| WO | WO 2007/140927 | 12/2007 |
| WO | WO 2008/061575 | 3/2008 |
| WO | WO 2008/039061 | 4/2008 |
| WO | WO 2008/119404 | 10/2008 |
| WO | WO 2008/141911 | 11/2008 |
| WO | WO 2008/148401 | 12/2008 |
| WO | WO 2009/000481 | 12/2008 |
| WO | WO 2009/049694 | 4/2009 |
| WO | WO 2009/065815 | 5/2009 |
| WO | WO 2009/073510 | 6/2009 |
| WO | WO 2009/089857 | 7/2009 |
| WO | WO 2009/126020 | 10/2009 |
| WO | WO 2010/018192 | 2/2010 |
| WO | WO 2010/052137 | 5/2010 |
| WO | WO 2010/056111 | 5/2010 |
| WO | WO 2010/083877 | 7/2010 |
| WO | WO 2011/010274 | 1/2011 |
| WO | WO 2011/045776 | 4/2011 |
| WO | WO 2011/047895 | 4/2011 |
| WO | WO 2011/051002 | 5/2011 |
| WO | WO 2011/069805 | 6/2011 |
| WO | WO 2011/072888 | 6/2011 |
| WO | WO 2011/092011 | 8/2011 |
| WO | WO 2011/095928 | 8/2011 |

OTHER PUBLICATIONS

"Large-Scale Linearization Circuit for Electrostatic Motors" IBM Technical Disclosure Bulletin, U.S. IBM Corporation, Bulletin, U.S. IBM Corporation, vol. 37, No. 10, pp. 563-564, Oct. 1, 1994.
ASCO RedHat, "2-Way Normally Closed General Purpose & Watertight Enclosure Gas Shutoff Valves ¾" to 3" NPT, 2/2 Series 8214 (200)," 8 pages, prior to Dec. 15, 2011.
ASCO RedHat, "2-Way Normally Closed General Purpose & Watertight Enclosure Gas Shutoff Valves ¾" to 3" NPT, 2/2 Series 8214 (200) AH(E) V710(B)," 6 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching", pp. 331-339, prior to Dec. 29, 2004.
Bonne et al. "Actuation-Based Fuel Gas Microsensors", IGT Symposium on "Natural Gas Quality, Energy Measurement, Metering and Utilization Practices", 17 pages, Mar. 2001.
Branebjerg, Gravesen, "A New Electrostatic Actuator Providing Improved Stroke Length and Force." IEEE, pp. 6-11, Feb. 4-7, 1992.
Bustgens et al., "Micropump Manufactured by Thermoplastic Molding" IEEE, pp. 18-21, 1994.
Cabuz et al., "Factors Enhancing the Reliability of Touch-Mode Electrostatic Actuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. On Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
Dungs Combustion Controls, "Double Solenoid Valve Combined Pressure Regulator and Safety Valves Servo Pressure Regulator, MBC- . . . -SE DN 65 DN 125," 8 pages, prior to Dec. 15, 2011.
Dungs Combustion Controls, "Double Solenoid Valve Combined Pressure Regulator and Safety Valves Infinitely Variable Operating Mode, MBC- . . . -VEF DN65—DN100," 8 pages, prior to Dec. 15, 2011.
Dungs Combustion Controls, "Double Solenoid Valve Control and Safety Combination Valve Servo Pressure Controller, DMV-SE 507/11-525/11," 8 pages, prior to Dec. 15, 2011.
Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator FRU Circulation Regulator," 4 pages, prior to Dec. 15, 2011.
Dungs Combustion Controls, "Pressure Switch for Gas, Air, Flue Gases and Combustion Products, GW 500 A4, GW 500 A4/2" 6 pages, prior to Dec. 15, 2011.
Dungs Combustion Controls, "Program," 4 pages, prior to Dec. 15, 2011.

(56) References Cited

OTHER PUBLICATIONS

Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'", Proceedings of the National Academy of Sciences of the United States of America, vol. 92, No. 7, pp. 2652-2656, Mar. 28, 1995.
Halg, "On a Nonvolatile Memory Cell Based on Micro-Electro-Mechanics", IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Kromschroder, "Governor with Solenoid Valve VAD Air/Gas Ratio Control with Solenoid Valve VAG," 8 pages, prior to Dec. 15, 2011.
Kromschroder, "Governor with Solenoid Valve VAD Air/Gas Ratio Control with Solenoid Valve VAG," 24 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Minami K et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Shikida et al., "Characteristics of an Electrostatically-Driven Gas Valve Under High Pressure Conditions," IEEE , pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of an S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc., "SKP . . . 15U . . . Gas Valve Actuator with Safety Shutoff Function," Document No. 155-751 SKP15 . . . U . . , 5 pages, Jul. 1, 2005.
Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.
Siemens Building Technologies, Inc., "SKP25 . . . U . . . Pressure Regulating Gas Valve Actuator with Safety Shut-Off Function," Technical Instructions Document No. 155-752, SKP25 . . . U, 7 pages, Jul. 1, 2005.
Srinivasan et al., "Self-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.
Wagner et al., "Bistable Microvalve with Pneumatically Coupled Membranes," IEEE, pp. 384-388, 1996.
www.combustion911.com/products/valve-proving-controls-tc-410.html, "Kromschroeder Valve Proving Controls TC410," 7 pages, prior to Dec. 15, 2011, printed May 23, 2012.
Yang et al., "Fluorescent Porous Polymer Films as TNT Chemosensors: Electronic and Structural Effects", J. Am. Chem. Soc., pp. 11864-11873, 1998.
Yang et al., "Porous Shape Persistent Fluorescent Polymer Films: An Approach to TNT Sensory Materials", J. Am. Chem. Soc., pp. 5321-5322, 1998.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
Examination Report for EP Application No. 12196398.7, dated Apr. 11, 2014.
U.S. Appl. No. 14/992,826, filed Jan. 11, 2016.
Universal Metering, "SmartValve Wireless Shut-Off Valve," Universal Metering Ltd., 4 pages, prior to Mar. 12, 2013.
Wilkerson, "Understanding Valve Actuatior Diagnostics," Control Engineering, vol. 56, No. 11, 4 pages, Nov. 2009.
U.S. Appl. No. 14/521,337, filed Oct. 22, 2014.
CSA, "B149.3S1-07 Supplement No. 1 to CAN/CAS-B149.3-05 Code for the Field Approval of Fuel-Related Components on Appliances and Equipment," 40 pages, Jan. 2007.
Korte et al., "Smart Valve Positioners and Their Use in Safety Instrumented Systems," Industrial Valves, pp. 41-47, 2009.
Allianz Risk Consulting, "Safety Shutoff Valves for Fuel-Fired Heating Equipment," Tech Talk, vol. 1, 3 pages, Oct. 2012.
Communication of a Notice of Opposition for EP Application Serial No. EP12196398.7, dated Feb. 15, 2016.
Honeywell, "V4730C/V8730C/V4734C 1:1 Gas/Air Servo Regulated Gas Valves, Product Data," 16 pages, 2006.
Honeywell, "V4943A/V8943A On/Off Diaphragm Gas Valves, Product Data," 8 pages, Apr. 2009.
Honeywell, "V5055A-F Industrial Gas Valves, Product Data," 12 pages, Nov. 2012.
https://en.wikipedia.org/wiki/SCADA, "SCADA," 10 pages, printed Mar. 29, 2016.
Maxon Corporation, "Functional Testing of Maxon Shut-off Valves, Valve Technical Data," 3 pages, 2008.
Response to Opposition for EP Application Serial No. EP12196398.7, filed Jul. 15, 2016.

* cited by examiner

VALVE WITH ACTUATOR DIAGNOSTICS

This application is a continuation-in-part of U.S. patent application Ser. No. 14/107,842, filed Dec. 16, 2013, and entitled "Visual Indicator for a Safety Shut Off Valve", which is a continuation-in-part of U.S. patent application Ser. No. 13/326,366, filed Dec. 15, 2011, and entitled "Gas Valve with Electronic Proof of Closure System. U.S. patent application Ser. No. 14/107,842, filed Dec. 16, 2013, is hereby incorporated by reference. U.S. patent application Ser. No. 13/326,366, filed Dec. 15, 2011, is hereby incorporated by reference.

BACKGROUND

The present disclosure pertains to valves, control of the valves and diagnostics related to valve control.

SUMMARY

The disclosure reveals a system for detection of degradation of a valve mechanism by measuring, for example, the time between powering an actuator and opening of the valve or the time between un-powering the actuator and closing of the valve. Time measurements may be compared with a predetermined threshold or previous measurements. An indication of a gradual degradation of the valve may be detected by an evaluation of a trend of measurements. Thus, a user may be notified of an impending failure before an actual failure of the valve. Diagnostic analysis may be of one or more items selected from a group consisting of combinations of time delays and distances of valve movement upon application and removal of power to the actuator, and one or more performance issues may be correlated for each of many combinations.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Often, a health of gas safety shut-off valves is not necessarily monitored. Therefore, a failure may lead to a sudden "no heat" situation. Detecting a degradation early is desirable for maintenance planning.

A safety shut-off valve may implement an internal controller, a proof-of-closure (POC) sensor, and a current/voltage monitor (i.e., current and/or voltage monitor) that detects power applied to the valve actuator (e.g. solenoid). By measuring the time between powering the actuator (by the current/voltage monitor) and detecting valve open (by the POC sensor), or the time between un-powering the actuator and detecting valve closed, gradual degradation of the valve may be detected and user warned prior to valve failure.

The present arrangement does not necessarily need additional hardware since an internal controller, a POC sensor and a current/voltage monitor may be implemented to serve other functionality too—POC (proof of closure), VPS (valve proving system), visual indication of valve status, and so forth.

An internal controller may receive a signal from a current/voltage monitor that monitors voltage and/or current applied to a valve actuator. This signal may include a signal indicating presence/absence of voltage, voltage level, presence/absence of current, current level, and so on. The internal controller may also receive a signal from a proof-of-closure (POC) sensor that indicates if a valve is in a closed position or in an open position. It may also indicate the rate of position change when the valve is transiting between the two end positions, or a position between fully open and fully closed.

The internal controller may be capable of measuring time between two events. Replacement of solenoids is not necessarily sought but rather advanced diagnostics (i.e., measuring time to open and time to close) may be added to the solenoid actuators.

The controller may measure time between, e.g., powering the actuator and detecting valve open ("time to open"), or the time between un-powering the actuator and detecting valve closed ("time to close"). The measured time may be further adjusted taking into account, e.g., measured voltage level on the actuator, ambient temperature, duration of actuator idle or run time, etc. A longer time than expected may be indicative of inefficiency in the valve assembly (e.g., increased friction, increased actuator inefficiency, and so forth). The time may be compared to a predetermined threshold or to previous measurements. A trend may be evaluated over several opening/closing cycles to conclude that the valve is degrading and the user may be notified. Both "time to open" and "time to close" may be evaluated differently—e.g., each may be compared to a different threshold.

Figure 1:
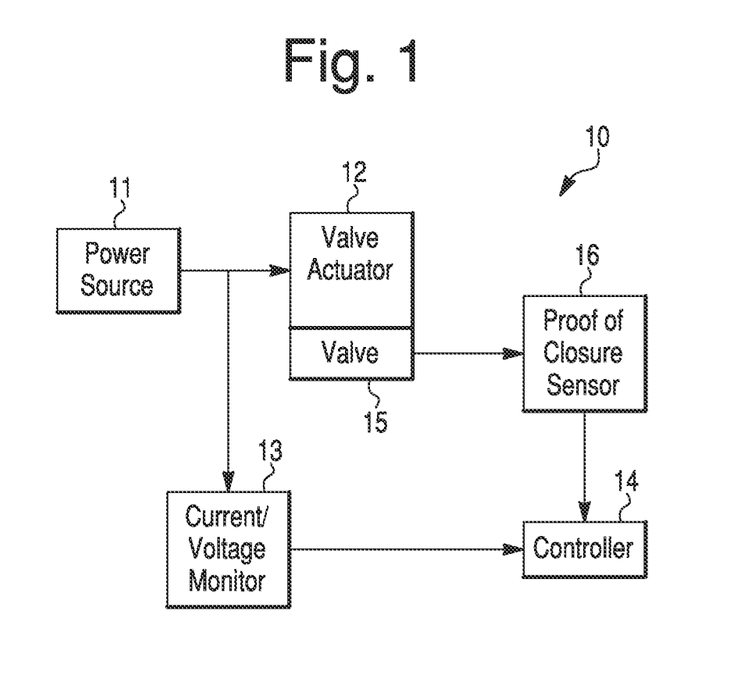
FIG. 1 is a diagram of a valve control system having valve and actuator diagnostics.

FIG. 1 is a diagram of a system 10 with valve and actuator diagnostics. A source 11 may provide electrical power to a valve actuator 12. A current/voltage monitor 13 may be connected to source 11. An output of monitor 13 may go to a controller 14. Valve actuator 12 may open or close a valve 15. A proof of closure sensor 16 may detect valve 15 closure or openness. An output from sensor 16 indicating valve position such as closure or openness may go to controller 14.

Figure 2:
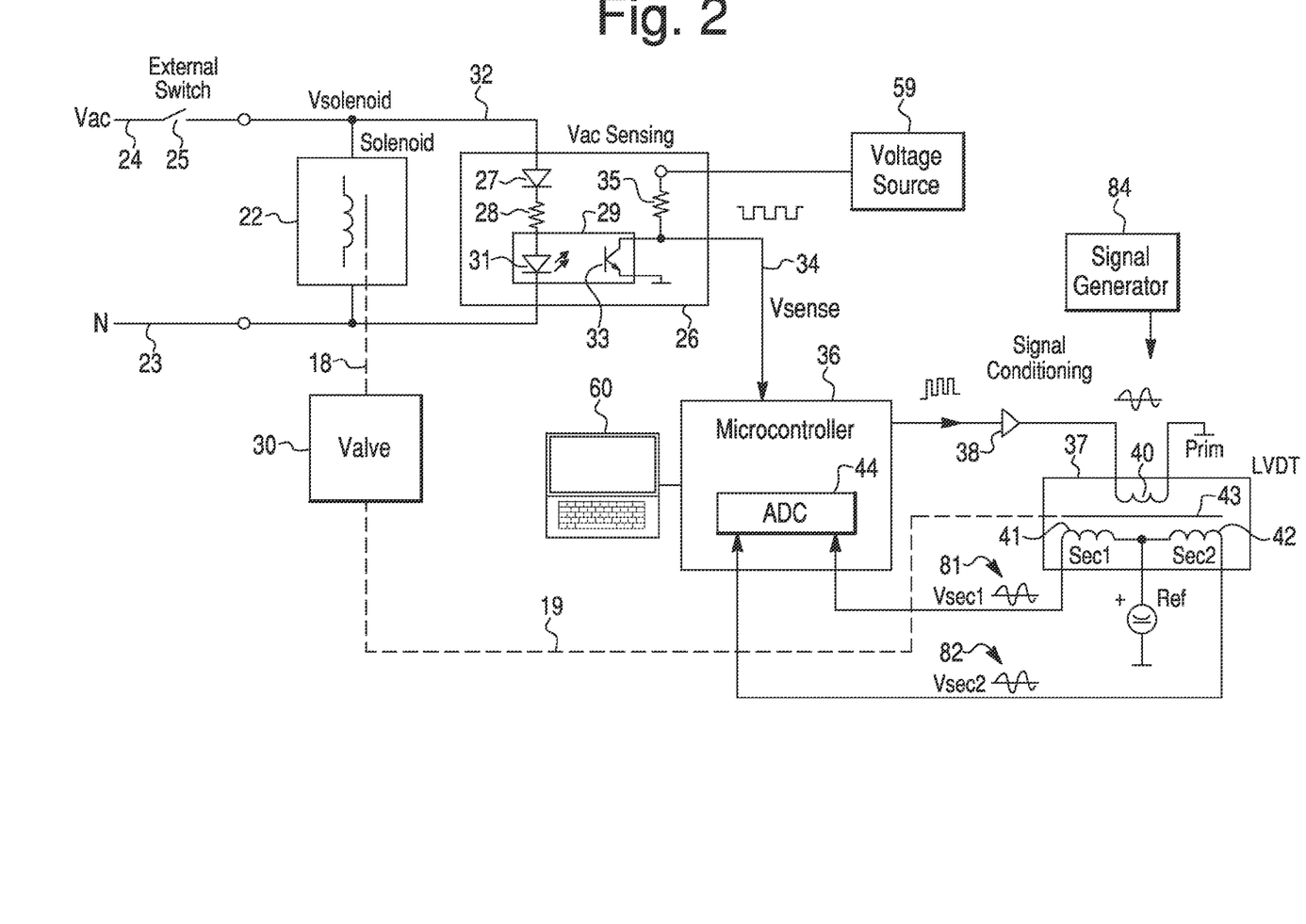
FIG. 2 is a diagram of a circuit schematic of the valve control system.

FIG. 2 is a diagram of a circuit schematic of the system. A valve actuator (e.g., solenoid) 22 may be supplied power off of AC mains 23 and 24 via an external switch 25 (e.g., relay contacts operated by a system controller). When switch 25 is closed, solenoid 22 is energized and acts to open a valve 30 via a connection 18. Presence of a supply voltage to solenoid 22 may be detected by a VAC sensing block 26.

Block 26 may have a series combination of a diode 27, a resistor 28 and an optocoupler 29 input diode 31. The series combination may be connected across lines 23 and 32. Optocoupler 29 may be triggered in line 32 (Vsolenoid) as a positive voltage versus line 23 (N, neutral) in that an output transistor 33 of optocoupler 29 turns on, pulling a Vsense line 34 low. When line 32 is negative versus line 23 or is absent, a pull-up resistor 35 may pull Vsense line 34 to a level of a low voltage supply or source 59 (e.g., a 3.3 volt supply block) that also may be used to supply a microcontroller 36. Microcontroller 36 may read the sense voltage on line 34 to detect a presence or absence of Vsolenoid on line 32.

Microcontroller 36 may also drive an LVDT (linear variable differential transformer) position sensor 37 that is mechanically linked with the valve to detect valve position. Microcontroller 36 may generate pulses (e.g., 50 kHz pulses between 0 volts and 3.3 volts with a 50 percent duty cycle) that can be further conditioned or affected by a signal conditioning block 38. Signal conditioning may involve amplification, shaping, filtering, level shifting, removing a DC component, and so on. A resulting signal may excite a primary winding (PRIM) 40 of LVDT 37. A stand-alone signal generator 84, separate from the microcontroller, alternatively may drive winding 40. This in turn may generate a signal 81 in a secondary winding (SEC1) 41 and a signal 82 in a secondary winding (SEC2) 42. The amplitudes of signals 81 (Vsec1) and signals 82 (Vsec2) may depend on a position of a core 43 moveable through a center of LVDT 37. Core 43 may be mechanically linked with a connection 19 to valve 30.

Microcontroller 36 may implement a program to process the amplitudes of signals 81 and 82 and calculate a valve position, for example, based on measuring the amplitudes with an analog-to-digital converter (ADC) 44, calculating the ratio of the amplitudes, and converting a result into a calculated position of valve 30 using a pre-stored transfer function. Thresholding may be applied to the calculated position, e.g., to distinguish the "valve below a position X" from the "valve above a position X", and so on. "Position X" may represent, for example, a "fully closed position".

Figure 3:
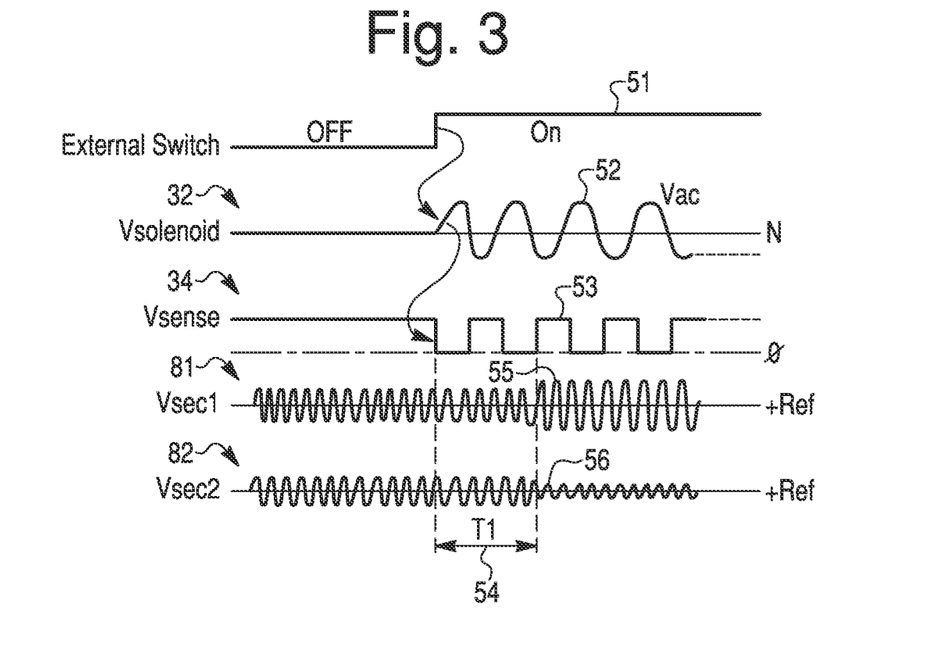
FIG. 3 is a diagram of example signals that may be a function of time relative to energizing an actuator, valve movement and detection of the movement.

FIG. 3 is a diagram of example signals that may be a function of time relative to energizing an actuator, valve movement and detection of the movement. Upon closing external switch 25, as indicated by waveform 51, line 32 may provide a voltage to the actuator, such as a solenoid 22, as indicated by waveform 52. The presence of the voltage to solenoid 22 may be detected by VAC sensing block 26 by sending Vsense pulses on line 34 to microcontroller 36. The pulses on line 34 are indicated by waveform 53. After a delay (T1) 54, valve 30 may move, which microcontroller 36 can determine by detecting a change in amplitudes of signals VSEC1 and VSEC2 of windings 41 and 42, respectively, as indicated by waveforms 55 and 56. Time delay 54 may be between energizing an actuator or solenoid 22 and a moving of valve 30. Delay 54 may be measured by microcontroller 36.

Figure 4:
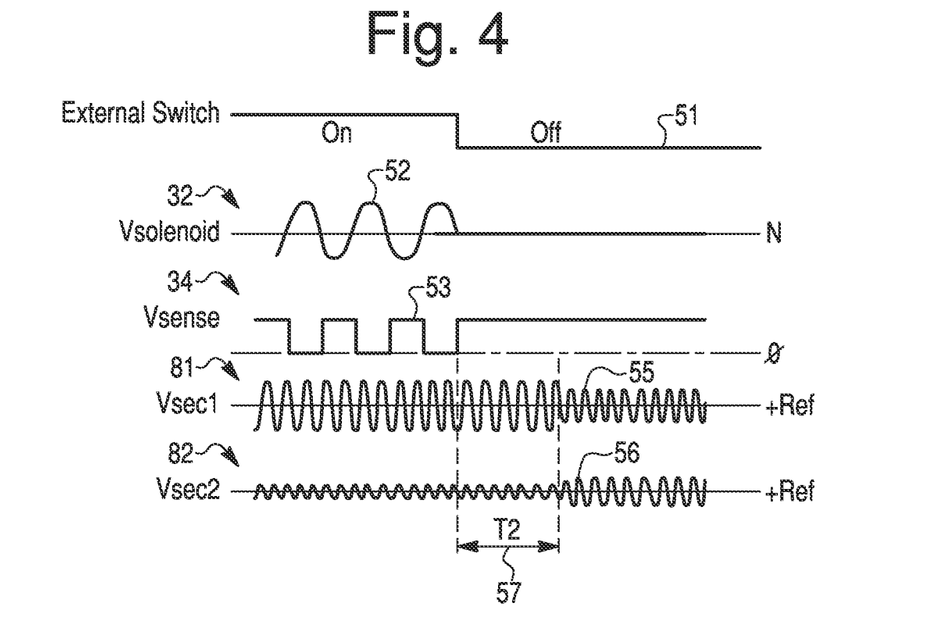
FIG. 4 is a diagram of example signals that may be a function of time relative to de-energizing the actuator, valve movement and detection of the movement.

FIG. 4 is a diagram of example signals that may be a function of time relative to de-energizing the actuator, valve movement and detection of the movement. Upon opening of external switch 25, as indicated by waveform 51, the voltage on line 32 to the actuator, such as solenoid 22, may be removed from solenoid 22, as indicated by waveform 52. At this time, VAC sensing stops sending Vsense pulses on line 34 to microcontroller 36. The stoppage of Vsense pulses on line 34 may be indicated by waveform 53. After a delay (T2) 57, the valve may move, which microcontroller 36 can detect by detecting a change in amplitudes of signals VSEC1 and VSEC2 of windings 41 and 42, respectively, as indicated by waveforms 55 and 56. Time delay 57 may be between de-energizing the actuator or solenoid 22 and moving valve 30. Delay 57 may be measured by microcontroller 36.

Various delays may be measured. One example is a delay between energizing or de-energizing the actuator or solenoid 22, and a first change in valve position. Another delay may be between energizing or de-energizing the actuator or solenoid 22, and reaching a final position of valve 30. Yet another delay may be between reaching one valve position and another valve position, or any other combination of positions. Magnitudes of the delays may be indicative of a particular failure mode or malfunction, such as plunger friction, actuator or solenoid efficiency degradation, and so forth.

A user interface 60 incorporating a screen, keyboard, a mouse, an outside connection, and other components as desired may be connected to microcontroller 36. Conditions of the valve and associated equipment may be indicated in accordance with measured times, delays, magnitudes of signals, and so on, on interface 60.

Figure 5:
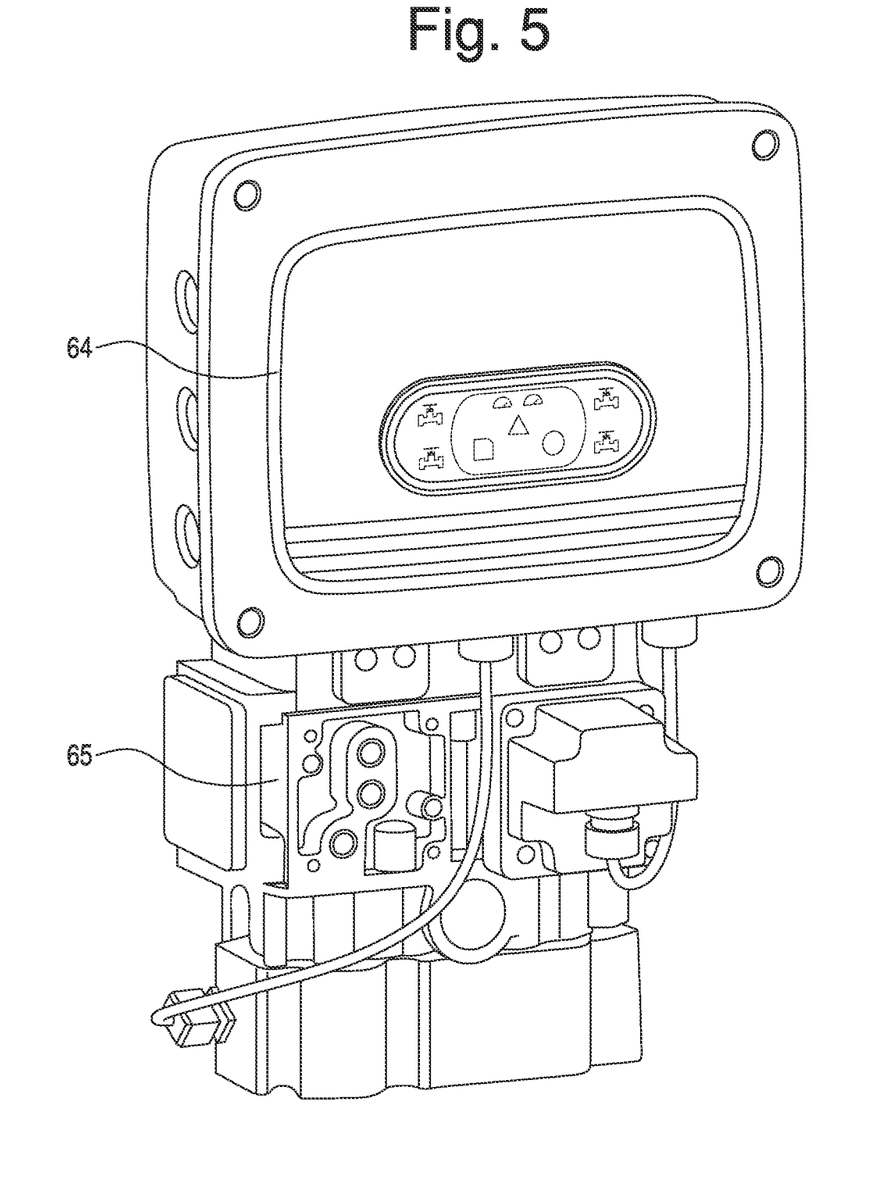
FIG. 5 is a diagram of a system showing a valve body and an electronics module.
Figure 6:
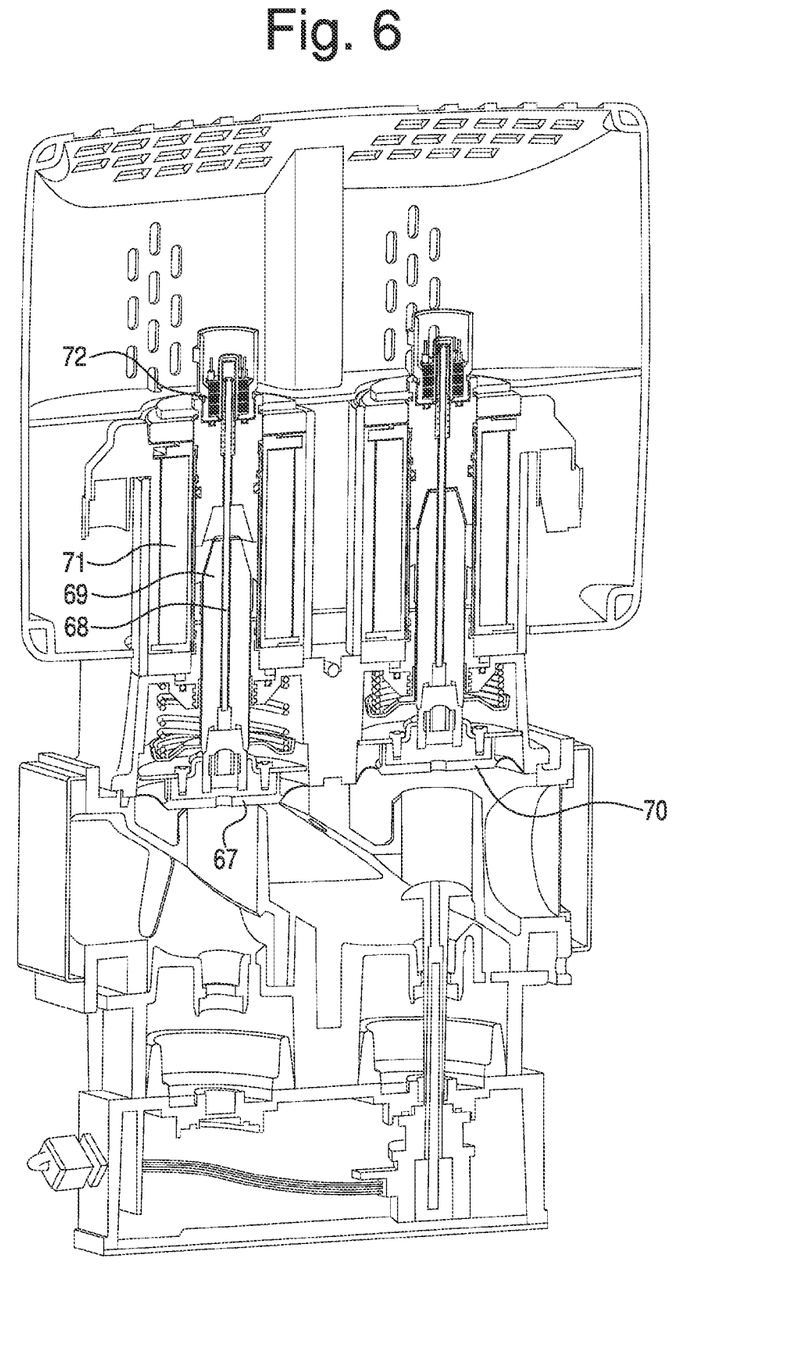
FIG. 6 is a diagram of a cut-away view of a valve assembly revealing an open valve disk, a closed valve disk, a stem, a solenoid, a plunger, an LVDT and other components.
Figure 7:
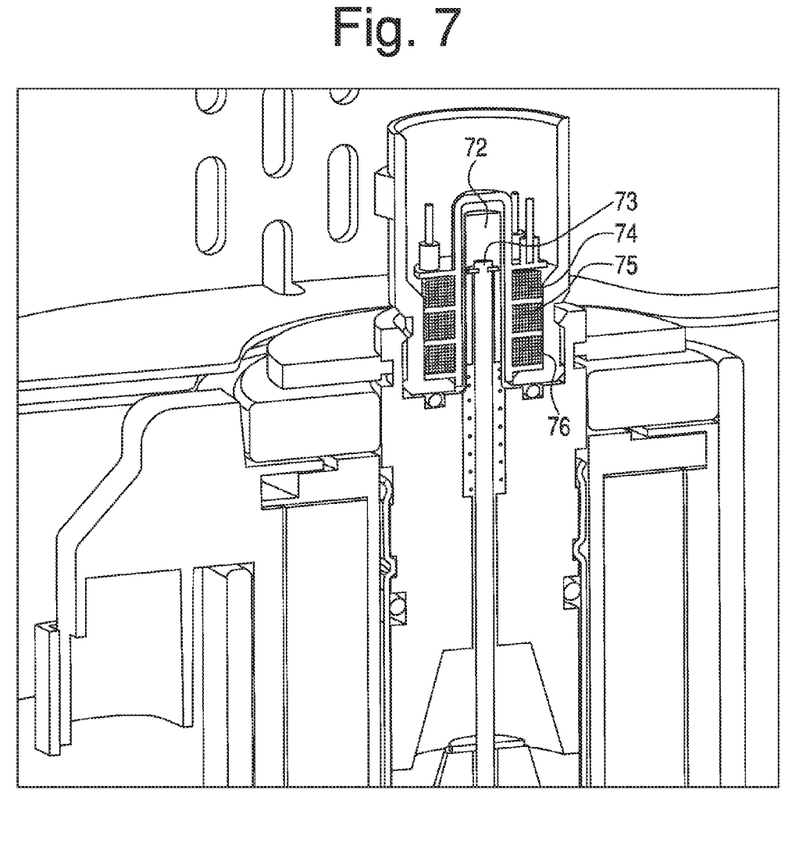
FIG. 7 is a diagram revealing windings of the LVDT.

FIG. 5 is a diagram of a valve system having a valve body 65 and an electronics module 64. FIG. 6 is a diagram of a cut-away view of a valve assembly revealing an open valve disk 70 and a closed valve disk 67. A stem 68 is a mechanical linkage between a valve and an LVDT core. Also shown is a solenoid 71, a plunger 69 and an LVDT 72. FIG. 7 is a diagram showing some details of LVDT 72. The details may incorporate an LVDT core 73, an LVDT first secondary winding 74, an LVDT primary winding 75 and a second secondary winding 76.

To recap, a valve system with actuator-based diagnostics, may incorporate a valve, an actuator connected to the valve so as to open and close the valve, a current/voltage monitor connected to the actuator so as to indicate if power is applied to the actuator, a position sensor connected to the valve, and a microcontroller connected to the current/voltage monitor and the position sensor. A first amount of time between an application of power to the actuator and movement of the valve may be measured by the microcontroller, and a second amount of time between a removal of power to the actuator and a movement of the valve may be measured by the microcontroller.

Applying power to the actuator may cause the valve to open. Removing power from the actuator may cause the valve to close.

The position sensor may incorporate a transformer connected to the valve and the microcontroller. The transformer may incorporate a primary winding connected to the microcontroller, a first secondary winding having a first terminal connected to the microcontroller and having a second terminal, a second secondary winding having a first terminal connected to the microcontroller and having a second terminal connected to the second terminal of the first secondary winding and to a reference voltage, and a magnetic core moveable by the primary winding and the first and second secondary windings. The core may be connected to the valve such that the core moves when the valve moves to open or close. The microcontroller may determine a position of the valve from signals of the first and second secondary windings.

The first amount of time between an application of power to the actuator and a movement of the valve, and the second amount of time between a removal of power to the actuator and a change in movement of the valve, may have values that indicate a health of the valve.

One or more delays may be selected from a group consisting of a delay between energizing the actuator and a first change in valve position, a delay between de-energizing the actuator and a first change in valve position, a delay between energizing the actuator and reaching a final position of the valve, a delay between de-energizing and reaching a final position of the valve, and a delay between reaching one valve position and another valve position. Magnitudes of delays may indicate a particular failure mode, malfunction, degradation, or a performance specification of one or more components of the system.

An approach of valve control with diagnostic characteristics may incorporate applying electrical power to an actuator to move a linkage connected to a valve part inside of a valve assembly configured to control a fluid through an internal portion of the valve assembly, sensing a position of the valve part with a detector having a linkage to the valve part, measuring a first time delay between applying power to the actuator and a change in position of the valve part resulting from a movement of the linkage by the actuator, measuring a second time delay between removing power from the actuator and a change in position of the valve part resulting from a movement of the linkage by the actuator, and correlating a magnitude of one or more time delays with a condition of one or more components of the valve assembly.

The approach may further incorporate deriving a list of magnitudes of the one or more time delays indicating conditions of the one or more components of the valve assembly for correlating a magnitude of one or more time delays with a condition of one or more components of the valve assembly.

The actuator may incorporate a moveable magnetic core having a winding by the core and connected to the linkage that is connected to the valve part inside the valve.

The detector may incorporate a transformer having a moveable core connected to the linkage that is connected to the valve part. The moveable core of the transformer may have a primary winding by the core and a secondary winding by the core. A movement of the moveable core of the transformer may affect a magnitude of a voltage at ends of the secondary winding for a given voltage applied to ends of the primary winding.

A valve control apparatus may incorporate an actuator, a position sensor, a valve connected to the actuator and the position sensor, and a current/voltage monitor connected to the actuator. A voltage may be applied to the actuator to result in a movement of the valve. A period of time may be measured between an application of the voltage to the actuator and a detection of movement of the valve by the position sensor. A diagnostic analysis may be performed on the period of time.

The apparatus may further incorporate a processor connected to the current/voltage monitor and to the position sensor. The processor may measure the period of time between an application of the voltage to the actuator and a detection of movement of the valve by the position sensor. The position sensor may incorporate a proof of closure sensor. The processor may perform the diagnostic analysis on the period of time.

The diagnostic analysis may indicate none, one or more issues with the valve, the actuator, the position sensor or the current/voltage monitor. A listing of periods of time and corresponding issues may be situated in a memory of the processor or be available via an external connection of the processor to an on-line site.

The actuator may be a solenoid having a moveable core that can cause movement of the valve. The position sensor may incorporate a transformer having a moveable core that can be moved by the valve.

The transformer may incorporate a primary winding connected to a signal generator, a first secondary winding, and a second secondary winding having a first end connected to a first end of the first secondary winding and to a reference voltage. The second end of the first secondary winding and the second end of the second secondary winding may be connected to the processor.

The apparatus may further incorporate a user interface connected to the processor. The user interface may reveal results of the diagnostic analysis on the period of time.

Diagnostic analysis may be made of one or more items selected from a group consisting of a time delay between application of power to the actuator and movement of the valve, removal of power to the actuator and movement of the valve, application of power to the actuator and reaching a certain valve position from another valve position, removal of power to the actuator and reaching a certain valve position from another valve position.

Diagnostic analysis may be made of one or more items selected from a group consisting of combinations of time delays and distances of valve movement upon application and removal of power to the actuator, and one or more performance issues may be correlated for each combination of the items.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A valve system with actuator-based diagnostics, comprising:
   a valve;
   an actuator connected to the valve so as to open and close the valve;
   a current/voltage monitor connected to the actuator so as to indicate if power is applied to the actuator;
   a position sensor connected to the valve; and
   a microcontroller connected to the current/voltage monitor and the position sensor; and
   wherein:
   a first amount of time between an application of power to the actuator and movement of the valve is measured by the microcontroller;
   the first amount of time is selected from a group consisting of a delay between initially energizing the actuator and a first change in valve position and a delay between initially energizing the actuator and reaching a final position of the valve;
   a second amount of time between a removal of power to the actuator and a movement of the valve is measured by the microcontroller;
   the second amount of time is selected from a group consisting of a delay between initially de-energizing the actuator and a first change in valve position, and a delay between initially de-energizing and reaching a final position of the valve;

the microcontroller is configured to adjust the measured first amount of time based on a voltage level of the power applied to the actuator; and one or more of the first amount of time and the second amount of time have values that indicate a health of the valve.

2. The system of claim 1, wherein the position sensor comprises a transformer connected to the valve and the microcontroller.

3. The system of claim 2, wherein the transformer comprises:

a primary winding connected to the microcontroller;

a first secondary winding having a first terminal connected to the microcontroller, and having a second terminal;

a second secondary winding having a first terminal connected to the microcontroller and having a second terminal connected to the second terminal of the first secondary winding and to a reference voltage; and a magnetic core moveable by the primary winding and the first and second secondary windings; and wherein the core is connected to the valve such that the core moves when the valve moves to open or close.

4. The system of claim 3, wherein the microcontroller determines a position of the valve from signals of the first and second secondary windings.

5. The system of claim 1, wherein:

applying power to the actuator causes the valve to open; and removing power from the actuator causes the valve to close.

6. The system of claim 1, wherein the first amount of time between an application of power to the actuator and a movement of the valve, and the second amount of time between a removal of power to the actuator and a change in movement of the valve, have values that indicate the health of the valve.

7. The system of claim 1, wherein magnitudes of delays indicate a particular failure mode, malfunction, degradation, or performance specification of one or more components of the system.

8. A valve control apparatus comprising:

an actuator;

a position sensor;

a valve connected to the actuator and the position sensor;

a current/voltage monitor connected to the actuator; and a processor connected to the current/voltage monitor and to the position sensor; and wherein:

a voltage is applied to the actuator to result in a movement of the valve;

a period of time is measured between an application of the voltage to the actuator and a detection of movement of the valve by the position sensor, the period of time is indicative of a health of the valve;

the measured period of time is adjusted based on a voltage level of the voltage applied to the actuator:

the period of time is selected from a group consisting of a time delay between an initial application of power to the actuator and initial movement of the valve, an initial removal of power to the actuator and initial movement of the valve, an initial application of power to the actuator and reaching a final position of the valve, and an initial removal of power to the actuator and reaching a final position of the valve;

a diagnostic analysis is performed on the period of time to determine the health of the valve; and the processor measures the period of time between an application of the voltage to the actuator and a detection of movement of the valve by the position sensor;

the processor performs the diagnostic analysis on the period of time.

9. The apparatus of claim 8, wherein: the position sensor comprises a proof of closure sensor.

10. The apparatus of claim 9, wherein:

the diagnostic analysis indicates none, one or more issues with the valve, the actuator, the position sensor or the current/voltage monitor; and a listing of different periods of time and a corresponding of the one or more issues are situated in a memory of the processor or available via an external connection of the processor to an on-line site.

11. The apparatus of claim 10, wherein diagnostic analysis can be made of one or more items selected from a group consisting of combinations of time delays and distances of valve movement upon application and removal of power to the actuator, and one or more performance issues are correlated for each combination of the items.

12. The apparatus of claim 9, wherein:

the actuator is a solenoid having a moveable core that can cause movement of the valve; and the position sensor comprises a transformer having a moveable core that can be moved by the valve.

13. The apparatus of claim 12, wherein the transformer comprises:

a primary winding connected to a signal generator;

a first secondary winding; and a second secondary winding having a first end connected to a first end of the first secondary winding and to a reference voltage; and wherein a second end of the first secondary winding and a second end of the second secondary winding are connected to the processor.

14. The apparatus of claim 9, further comprising:

a user interface connected to the processor; and wherein the user interface reveals results of the diagnostic analysis on the period of time.

* * * * *